United States Patent [19]
Christie et al.

[11] 3,981,793
[45] Sept. 21, 1976

[54] AUTOMATIC CONTROL OF A HYDROCRACKER

[75] Inventors: David A. Christie; James W. Hobbs, both of Bartlesville, Okla.

[73] Assignee: Phillips Petroleum Company, Bartlesville, Okla.

[22] Filed: June 30, 1975

[21] Appl. No.: 591,920

[52] U.S. Cl. .......................... 208/108; 208/DIG. 1; 235/151.12
[51] Int. Cl.² ........................................ C10G 13/00
[58] Field of Search ..................... 208/108, DIG. 1; 235/151.12, 151.13

[56] References Cited
UNITED STATES PATENTS

| | | | |
|---|---|---|---|
| 3,000,812 | 9/1961 | Boyd | 208/138 |
| 3,402,121 | 9/1968 | Hallman | 208/59 |
| 3,458,691 | 7/1969 | Boyd | 235/151.12 |
| 3,592,606 | 7/1971 | Boyd | 23/253 |

*Primary Examiner*—Herbert Levine

[57] ABSTRACT

From the values for the recycle oil feed rate and the fresh oil feed rate of a hydrocracker a material balance conversion computation is carried out resulting in a material balance conversion signal. From the values for the hydrogen flow rate the temperatures and the pressures thereof and the total oil feed flow rate and the flow rate and temperature of the material leaving the hydrocracker, an enthalpy balance conversion computation is carried out resulting in an enthalpy balance conversion signal. The material balance conversion signal and the enthalpy balance conversion signals are computed into a control signal. The control signal regulates the temperature of the total charge to the hydrocracker to maintain the actual percentage conversion at a desired value.

11 Claims, 3 Drawing Figures

AUTOMATIC CONTROL OF A HYDROCRACKER

This invention relates to the control of hydrocrackers. More specifically, this invention relates to controlling the operation of a hydrocracker, or a plurality of hydrocrackers, employing a digital computer.

BACKGROUND OF THE INVENTION

In a hydrocracker large hydrocarbon molecules are cracked into smaller molecules in the presence of a catalyst and hydrogen. It is desirable to carry out the hydrocracking process with a maximum of efficiency. Ideally this maximum efficiency is achieved by a maximum percentage conversion at a set of otherwise constant process parameters. However, certain process parameters, such as the availability of hydrogen, sometimes cause the hydrocracking process to be carried out at a smaller percentage conversion. However, in this case, too, the maximum percentage conversion achievable under these circumstances is desirable to be achieved.

One of the problems arising when an automatic control for a hydrocracker is to be designed results from the fact that the composition of the oil fed to the hydrocracker is not constant. In addition, the temperatures of the feedstreams are not constant. Thus, it would be desirable to have available an automatic control for a hydrocracker which would keep the actual conversion at a given set point value despite variation in oil feed composition and/or feedstream temperature.

THE INVENTION

It is one object of this invention to provide a control method for a hydrocracker operation.

Another object of this invention is to provide a control method for a hydrocracker by which the conversion is controlled and kept at a constant value.

Still a further object of this invention is to provide a control method for a hydrocracker having a controlled conversion in which process inaccuracies of one control calculation are compensated for by another control calculation based on measured conversion.

These and other objects, advantages, features and details of the invention will become apparent from the following description, the appended claims and the drawing in which FIG. 1 shows a schematic diagram of a hydrocracker operation;

Figure 1:
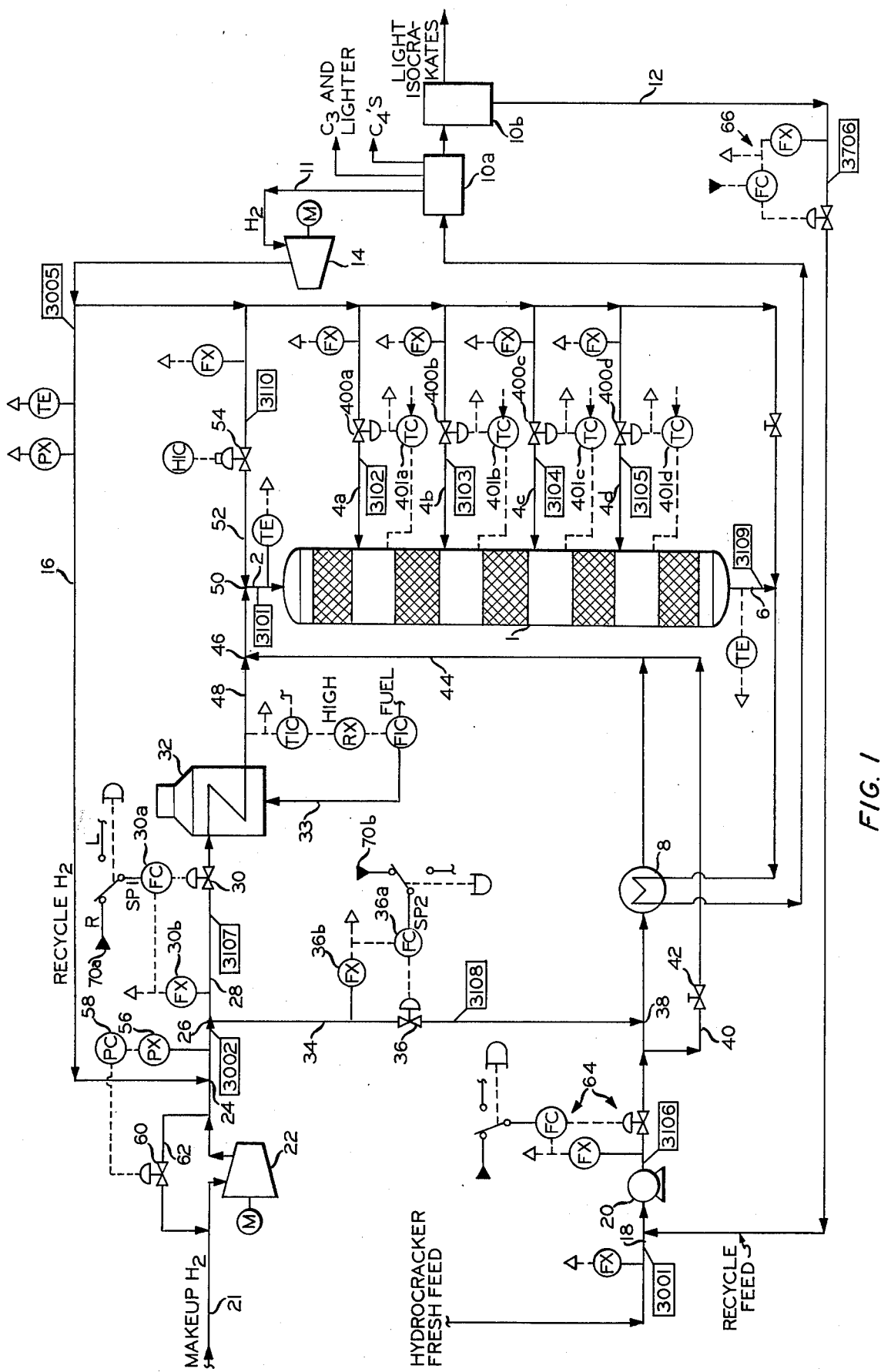

In accordance with this invention there is now provided a control process for a hydrocracker operation wherein A. an enthalpy balance conversion computation is carried out based on the process parameters and the streams to and from the hydrocracker;

B. a material balance conversion computation is carried out based on the total oil feed rate and the recycle oil feed rate; and C. the temperature of the total charge at the hydrocracker feed inlet portion is regulated responsive to these two conversion computations such as to keep the actual conversion substantially at a desired value.

More specifically, the control method of this invention involves the steps of a. passing a stream of fresh oil feed into the feed inlet portion of said hydrocracker as part of the charge thereto, b. passing at least one hydrogen stream into the feed inlet portion of said hydrocracker as part of the charge thereto, c. withdrawing reactor effluent from said hydrocracker, d. separating from said reactor effluent a recycle oil stream, e. passing said recycle oil stream into the feed inlet portion of said hydrocracker as part of the charge thereto, f. determining the rate of total oil flow into the hydrocracker and generating a total oil flow rate signal responsive thereto, g. generating hydrogen flow, hydrogen pressure and hydrogen temperature signals responsive to the flow rate, pressure and temperature of each hydrogen stream introduced into the reactor, h. determining the inlet temperature of the charge to the hydrocracker at the feed inlet portion thereof and generating an inlet temperature signal responsive thereto, i. determining the temperature of the effluent withdrawn from the hydrocracker proximate to the outlet portion thereof and generating an outlet temperature signal responsive thereto, j. automatically computing from the signals generated in steps (f) through (i) an enthalpy balance conversion and generating an enthalpy balance conversion signal responsive thereto, k. determining the flow rate of said recycle oil stream and generating a recycle oil flow rate signal responsive thereto, l. automatically computing from said total oil flow rate signal and from said recycle oil flow rate signal a material balance conversion and generating a material balance conversion signal responsive thereto, m. generating an inlet temperature control signal responsive to both the material balance conversion signal and the enthalpy balance conversion signal, with the further provision that the material balance conversion is calculated for a first set of parameters and the enthalpy balance conversion is calculated for a second set of parameters determined at a time subsequent to the determination of the first set of parameters, n. generating a control signal responsive to the inlet temperature control signal and the inlet temperature signal, o. regulating the temperature of the charge to the hydrocracker at the feed inlet portion thereof responsive to said control signal such as to control the actual conversion rate of the hydrocracker to keep it at a desired value.

The hydrocracker control scheme of this invention is designed to control hydrocracking conversion by using both a material balance method and an enthalpy balance method to calculate a conversion value. A desired conversion value representative of plant requirements indicates the actual conversion to be maintained. This desired conversion value or set point is compared with the results from the material balance conversion computation to obtain a first value which is compared to the results of the enthalpy balance computation around the hydrocracker. This results in a second value proportional to the desired hydrocracker inlet temperature which is compared with the actual hydrocracker inlet temperature to obtain a third value. This third value will be used to manipulate the hydrogen flows to a furnace and to a feed effluent exchanger in order to either increase or decrease the hydrocracker inlet temperature of the total feed charge to effectively obtain a greater or lesser value of actual conversion. In order to obtain the conversion value from the enthalpy balance computation, the process dynamics, computation of the fraction of oil feed in the liquid state and the actual heat balance around the hydrocracker are taken into account. The method used in evaluating the fraction liquid of the oil feed to the hydrocracker assumes a constant oil feed composition. Changes in the oil feed composition will result in inaccuracies in the conversion value obtained from the heat balance method. However, these inaccuracies can be compensated for by the conversion value obtained by the material balance conversion computation. The results from the material balance conversion computation are delayed for a sufficient period of time to take into account the dynamics of the hydrocracking process and the dynamics of adjusting hydrogen flows and temperatures before being compared with the enthalpy balance computation.

In accordance with the presently preferred embodiment of this invention, the inlet temperature control signal is generated with the further provision that in case an increase (decrease) of the material balance conversion signal in the absence of a change of the enthalpy balance conversion signal would cause a change in the inlet temperature control signal that tends to decrease (increase) the inlet temperature then also an increase (decrease) of the enthalpy balance conversion signal in the absence of a change of the material balance conversion signal would cause a change in the inlet temperature control signal that also would tend to decrease (increase) the inlet temperature.

The enthalpy balance conversion computation is carried out with some inherent inaccuracies. These inaccuracies are particularly caused by the fact that the computation, which will be explained in some more detail in the following, involves evaluating the fraction liquid of the oil feed which is fed to the reactor, assuming a constant oil feed composition. Changes in the oil feed composition, for instance, will therefore result in error in the enthalpy balance conversion computation. The material balance conversion computation, which is based on actual fresh oil feed flow rate and actual recycle oil flow rate will compensate for these errors.

In accordance with a further presently preferred embodiment of this invention, two hydrogen streams are fed to the hydrocracker as part of the charge thereto. The first hydrogen stream is heated in a furnace whereas the second hydrogen stream is at a lower temperature. The actual control is carried out in this embodiment by controlling the flow rates of both hydrogen steams in opposite directions responsive to the control signal so as to change the temperature of the total hydrogen feed while leaving the total flow rate of the hydrogen constant. By changing the temperature of the hydrogen feed, the temperature of the total charge to the hydrocracker which is the combined feed of fresh oil, recycle oil and hydrogen, is adjusted. An increase in the temperature of the total charge tends to increase the actual percentage conversion whereas a decrease in the total feed temperature tends to decrease the actual percentage conversion.

In accordance with a further presently preferred embodiment, the enthalpy balance conversion is calculated based on a total enthalpy balance of the hydrocracker. Essentially the enthalpy of the various streams entering the reactor, of the effluent leaving the reactor and the evaporation energy are calculated under the assumption of zero losses to obtain the cracking enthalpy. This value of the cracking enthalpy is divided by the multiplication product of the quantity of oil fed to the reactor times the specific cracking enthalpy which is known for the various oil feedstocks or which can be determined in accordance with known procedures.

The method of enthalpy balance calculation is a particularly advantageous way for calculating the conversion for a hydrocracker which has a plurality of fixed catalyst beds and one or more quench streams of hydrogen being injected into at least one of the catalyst beds. The flow rate of hydrogen in each quench stream in this embodiment of the invention is determined and a quench hydrogen signal responsive thereto is delivered. These hydrogen flow rates are utilized for the calculation of the enthalpy balance. In addition, the temperature of said catalyst beds into which the hydrogen is injected is determined, a corresponding catalyst bed temperature signal is generated and the flow rate of the respective quench stream of hydrogen is controlled by the corresponding catalyst bed temperature signal so as to keep the temperature of the respective catalyst bed at a given value or set point by increasing or decreasing the corresponding hydrogen flow rate in the respective quench stream into the respective catalyst bed.

A still further presently preferred embodiment involves the control of a plurality of hydrocrackers. In this embodiment the material balance conversion signal is computed for all the reactors together whereas the enthalpy balance conversion signal is generated for each reactor individually. Preferably, the material balance conversion signal, which is the same for all of the individual reactors for the generation of the control signal for the individual hydrocracker, is biased by a deviation signal which corresponds to the deviation of the individual enthalpy balance conversion signal from the average enthalpy balance conversion signal of all the reactors.

The invention will be still more fully understood from the following detailed description of preferred embodiments of the control system as well as the equations involved in calculating the two conversion rates.

Referring now to FIG. 1, there is shown a hydrocracker 1 into which a feedstream comprising oil and hydrogen is introduced via conduit 2. The oil in this feedstream was cracked in the hydrocracker 1 which is a fixed bed reactor. Hydrogen quench streams are introduced at various levels via conduits 4A, 4B, 4C and 4D into the reactor. These quench streams serve to control the temperature in the various catalyst beds in the reactor. Each of the feed lines 4A to 4D is therefore equipped with a controlled valve 400A, 400B, 400C and 400D. These valves are individually opened or closed responsive to the temperature of the individual catalyst bed which is sensed and a respective signal is transferred to the corresponding temperature controller 401A, 401B, 401C and 401D. These temperature controllers compare the sensed temperature signal with a set point and responsive thereto actuate the corresponding valve.

From the bottom of the hydrocracker the cracked product is withdrawn via a conduit 6. The cracked product flows through an indirect heat exchanger 8 to a separator 10a wherein the cracked product is separated into a hydrogen stream, a stream of $C_3$ and lighter hydrocarbons, a stream of $C_4$ hydrocarbons and a stream of heavier hydrocarbons. In a splitter and stripper unit 10b, the stream of the heavier hydrocarbons is separated into a light isocrackate and a stream of recycle oil which is withdrawn from the splitter and stripper unit 10b via a conduit 12. The light isocrackates are further treated in units not shown in the drawing.

The hydrogen stream leaving the separator 10a via conduit 11 is recycled via a compressor 14 and a conduit 16 and is combined with a stream of makeup hydrogen at the location 24.

The total feed charge to the hydrocracker 1 consists essentially of oil and hydrogen. The oil stream is a combined stream of fresh feed from conduit 18 and of recycle feed from conduit 12. This combined stream is pumped by a pump 20 through conduit 2 into the hydrocracker 1.

The hydrogen feed stream is a combined feed of makeup hydrogen from conduit 21 compressed by a compressor 22 and recycle hydrogen compressed by a compressor 14. The combined hydrogen stream is split at the location 26 into a first hydrogen stream which flows through a conduit 28 and a control valve 30 into a furnace 32 to which heating fuel is supplied via conduit 33 and into a second hydrogen stream which flows through a conduit 34 and a control valve 36 into a mixture with the feed oil stream at location 38. The oil and the second hydrogen stream combined at 38 flow through the heat exchanger 8 where they are heated by the indirect heat exchange relationship with the cracked product leaving the reactor 1 via line 6. A conduit 40 controlled by a valve 42 bypasses the heat exchanger 8 so that part of the oil can pass to the hydrocracker without being preheated in the heat exchanger 8. The combined oil and second hydrogen stream then flow via conduit 44 into mixture with the heated first hydrogen stream leaving the furnace 32 via conduit 48. The streams are combined at the location 46 and this stream consisting of the oil, the first hydrogen stream and the second hydrogen stream is then finally combined at the location 50 with a trim hydrogen stream from conduit 52, the flow in this line being controlled by a valve 54.

A pressure sensor 56 measures the pressure of the hydrogen stream and a pressure controller 58 actuates a valve 60 in a conduit 62 bypassing the compressor 22 in case the hydrogen pressure should exceed a set point.

The total flow of the oil into the hydrocracker as well as the recycle flow of oil are controlled by flow rate control systems 64 and 66 respectively. The elements and operation of these control systems constitute part of the overall control system for the entire plant but do not constitute part of the present invention. A more detailed explanation of these control systems is therefore not needed for this application. These control systems adjust the flow rate of the total oil and the recycle oil to a set point which set point is the result of a computer calculation.

For the control system of this invention various parameters of the hydrocracking process are measured and converted into digital data which are stored in a digital computer. From these data the computer calculations the control signal as will be explained in the following. The locations to which these various parameters relate are shown in FIG. 1 by four-digit numbers. The actual sensors for the flows, temperatures, pressures, etc., are also schematically shown in FIG. 1. Flow meters are characterized by the letters FX, temperature measuring units are shown in FIG. 1 by the letters TE, and pressure transducers are shown in FIG. 1 by the letters PX. Thus, for instance, the pressure transducer 56 measures the hydrogen pressure of the combined makeup and recycle hydrogen stream; the designation for this measured pressure in FIG. 1 is 3002 and in FIG. 2 the respective signal in the logical flow diagram is referred to as P3002. The four-digit numbers also constitute the reference numeral for the analog signal of the value of the various parameters in the drawing. The following list explains for what process parameters the individual four-digit numbers stand.

| Parameter Measured | Detector | Location in Drawing |
|---|---|---|
| Flow rate of trim $H_2$ | Flow meter | F 3110 |
| Pressure of trim $H_2$ | Pressure transducer | P 3005 |
| Temperature of trim $H_2$ | Temperature sensor | T 3005 |
| Flow rate of $H_2$ to furnace | Flow meter | F 3107 |
| Pressure of $H_2$ | Pressure transducer | P 3002 |
| Flow rate of $H_2$ to heat exchanger | Flow meter | F 3108 |
| Pressure of $H_2$ | Pressure transducer | P 3002 |
| Total oil flow rate | Flow meter | F 3106 |
| Hydrocracker feed inlet temperature | Temperature sensor | T 3101 |
| Quench hydrogen into Bed 2 | | |
| Flow rate | Flow meter | F 3102 |
| Temperature | Temperature sensor | T 3005 |
| Pressure | Pressure transducer | P 3005 |
| Bed 3 | | |
| Flow rate | Flow meter | F 3103 |
| Temperature | Temperature sensor | T 3005 |
| Pressure | Pressure transducer | P 3005 |
| Bed 4 | | |
| Flow rate | Flow meter | F 3104 |
| Temperature | Temperature sensor | T 3005 |
| Pressure | Pressure transducer | P 3005 |
| Bed 5 | | |
| Flow rate | Flow meter | F 3105 |
| Temperature | Temperature sensor | T 3005 |
| Pressure | Pressure transducer | P 3005 |
| $H_2$ concentration in quench | Constant | A 3000 |
| Outlet temperature | Temperature sensor | T 3109 |
| Hydrocracker fresh feed flow rate | Flow meter | F 3001 |
| Recycle feed flow rate | Flow meter | F 3706 |

Figure 2:
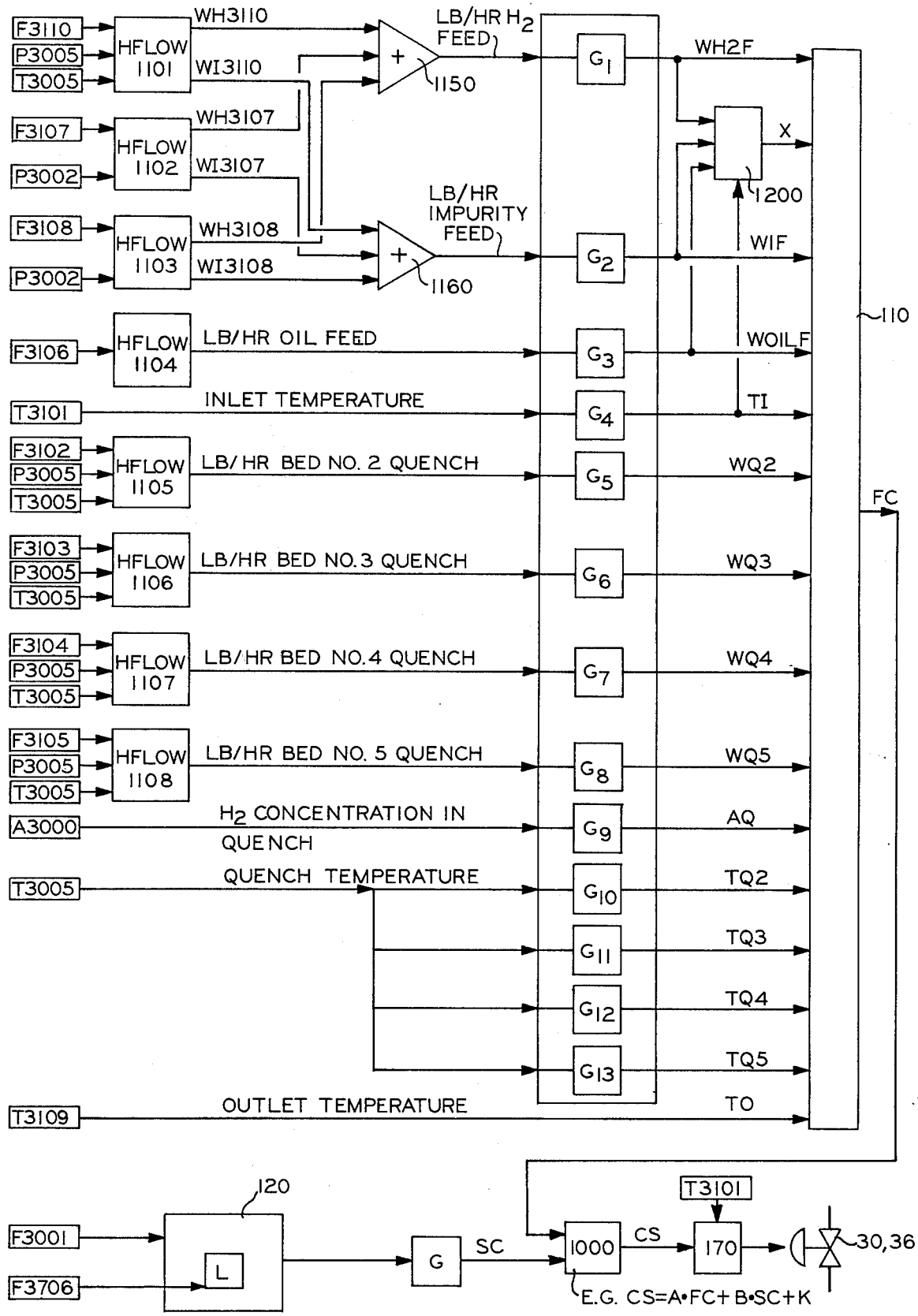
FIG. 2 shows a schematic diagram of the logic of the control system.

Referring now to FIG. 2, there is schematically shown the logic of the control of the hydrocracker. This control logic can be followed either by a digital computer or by an analog computer or by a combination of such computers. Presently preferred is the use of a digital computer. In this control system an enthalpy balance conversion computation is carried out at 110. A material balance conversion computation is carried out at 120. A material balance conversion computation is carried out at 120. These computations which are automatically carried out preferably in a digital computer result in an enthalpy balance conversion signal FC and in a material balance conversion signal SC respectively. These signals are then combined into a control signal CS which controls via an inlet temperature controller 170 and, for instance, a valve system 30, 36, for the hydrogen feed flow, the temperature of the total charge to the hydrocracker. The two conversion signals FC and SC are automatically combined in a unit 1000 in such a way that an increase in the signal FC alone causes a change in the control signal CS in the same direction as an increase in the material balance conversion signal SC alone causes the control signal CS to change. Thus if the enthalpy balance conversing signal FC, when increased, decreases the signal CS, also the material balance conversion signal SE, when increased, causes a decrease of the control signal CS as long as the other signal is kept constant. The simplest and presently preferred method of achieving the result just explained is by linearly relating the two conversion signals FC and SC with the control signal. Thus the control signal is composed of the conversion signals by the following relationship:

$$CS \sim A(FC) + B(SC) + K$$

In this equation A and B and K are constants.

The mathematical equations on which the calculations both of the enthalpy balance conversion signal and the material balance conversion signal are based will be given later. Based on these equations a digital computer in a subroutine or program 110 or an analog computer carries out the calculations of the ethalpy balance conversion equations and in another subroutine 120 carries out the calculation of the material balance conversion signal. The actual data used for these subroutines are also shown in FIG. 2. Since the enthalpy balance conversion equations essentially constitute an enthalpy balance the volumetric flow rate, pressure, temperature and impurity signals have first to be converted into mass flow rate data. Thus, from the volumetric flow rate, pressure and temperature signals sensed, a mass flow rate of trim hydrogen WH 3110 is calculated in unit 1101. In the same unit 1101 also a signal WI 3110 defining the mass flow rate in pounds per hour of impurities in the trim hydrogen stream is calculated. These impurity streams are taken into consideration since they contribute to the enthalpy balance. Unit 1101 uses for this calculation a known constant giving the hydrogen concentration or, respectively, the impurity concentration in the trim hydrogen stream. Essentially in the same manner, unit 1102 calculates a mass flow rate signal in pounds per hour of hydrogen flow to the furnace, which signal is labeled WH 3107 in FIG. 2. Correspondingly an impurity mass flow rate WI 3107 is calculated by the unit 1102. Similarly unit 1103 calculates a signal for the mass flow rate of hydrogen WH 3108 flowing into mixture with the oil and through the heat exchanger. A corresponding impurity signal WI 3108 is also calculated by this unit 1103. The temperatures of the hydrogen flowing into the furnace and of the hydrogen flowing into mixture with the oil directly is not shown as an input in units 1102 and 1103. These temperatures are the same as those for the other calculations, namely T3005. The mass of these hydrogen flows is calculated taking these temperatures into account.

The three hydrogen mass flow rate signals, WH 3110, WH 3107 and WH 3108, are added in an adding unit 1150, resulting in a signal for the total hydrogen mass feed rate in pounds per hour. Correspondingly the three impurity signals WI 3110, WI 3107 and WI 3108, are added in an adding unit 1160, resulting in a total impurity feed rate signal for the number of pounds per hour of impurity being fed to the hydrocracker.

Unit 1104 transforms the signal of the oil flow rate F 3106, which is the total oil flow rate into the hydrocracker, into a signal in pounds per hour of oil feed. Four units, 1105, 1106, 1107 and 1108, carry out the same conversion as the units 1101, 1102 and 1103 to result in a signal for each quench stream defining the total flow rate in pounds per hour into the respective catalyst bed. These four units, 1105 to 1108, do not take the impurity of the hydrogen stream into consideration. Rather a separate signal A 3000 is fed to the computer which signal defines a weight concentration of hydrogen in the quench stream. The computer later on splits the signals resulting from the units 1105 to 1108 into a hydrogen flow rate and an impurity flow rate by multiplying the respective signals with the respective concentration factors.

The signals for the mass flow rate of the hydrogen streams, the mass flow rate of the impurity, the mass flow rate of the oil feed, the inlet temperature, the mass flow rate in the four quench streams, the hydrogen concentration in the quench streams and the quench temperature are modified with two first-order exponential lags which are connected in series. These lags can be software and consitute subroutines in a computer program when the digital computer is employed instead of the analog computer. The reactor inlet temperature is also compensated with a dead time which also can be part of the digital computer program. The dead time and the lag time constants for each variable in the lag units G 1 to G 13 are adjusted as proportional functions of the estimated reactor residence time. Residence time is estimated as a function of the hydrogen feed flow to the reactor.

In unit 1200, which can be a computer subroutine or a part of a computer program, the fraction liquid for the oil feed is computed. This computation is, as such, well known as the focal point method and is outlined, for instance, on page 223 of *Data Book on Hydrocarbons*, by J. B. Maxwell, January 1955. This method is based on a constant oil feed composition. Changes in the oil feed composition will result in an error in the computation of the fraction liquid and thus in the enthalpy balance conversion signal. The material balance conversion computation compensates for these errors.

The enthalpy balance conversion signal can be computed by a subroutine 110 from the signals obtained from the various lag units and the unit 1200. The signals used for calculating the enthalpy balance conversion signal are:

| Signals Used in Unit 110 | Meaning of the Abbreviations | Value of the Signal in |
|---|---|---|
| WH2F | Hydrogen feed flow rate | Lbs/hr |
| WIF | Impurity in feed flow rate | Lbs/hr |
| WOILF | Oil feed flow rate | Lbs/hr |
| TI | Inlet temperature | °F |
| WQ2 | First quench stream flow rate | Lbs/hr |
| WQ3 | Second quench stream flow rate | Lbs/hr |
| WQ4 | Third quench stream flow rate | Lbs/hr |
| WQ5 | Fourth quench stream flow rate | Lbs/hr |
| AQ | Molar hydrogen concentration in quench | |
| TQ2 | Temperature of first quench stream | °F |
| TQ3 | Temperature of second quench stream | °F |
| TQ4 | Temperature of third quench stream | °F |
| TQ5 | Temperature of fourth quench | |

-continued

| Signals Used in Unit 110 | Meaning of the Abbreviations | Value of the Signal in |
|---|---|---|
| | stream | °F |
| TO | Outlet temperature | °F |

The material balance conversion signal SC can be calculated from the flow rate values F3001 of the fresh hydrocarbon feed and F3706 of the recycle hydrocarbon feed by a subroutine 120. The result obtained is modified by a lag G. This lag can be a part of a computer program and constitutes a first order lag function. The time constant of, for instance, 60 minutes delays the material balance conversion signal for that amount of time. The lag time is dependent upon the hydrocracker process dynamics and takes into account the recycle feed term and its dynamics. In addition, the recycle signal F3706 is dynamically compensated by a software lead time function (L) having a time constant of, for instance, 5 minutes.

Figure 3:
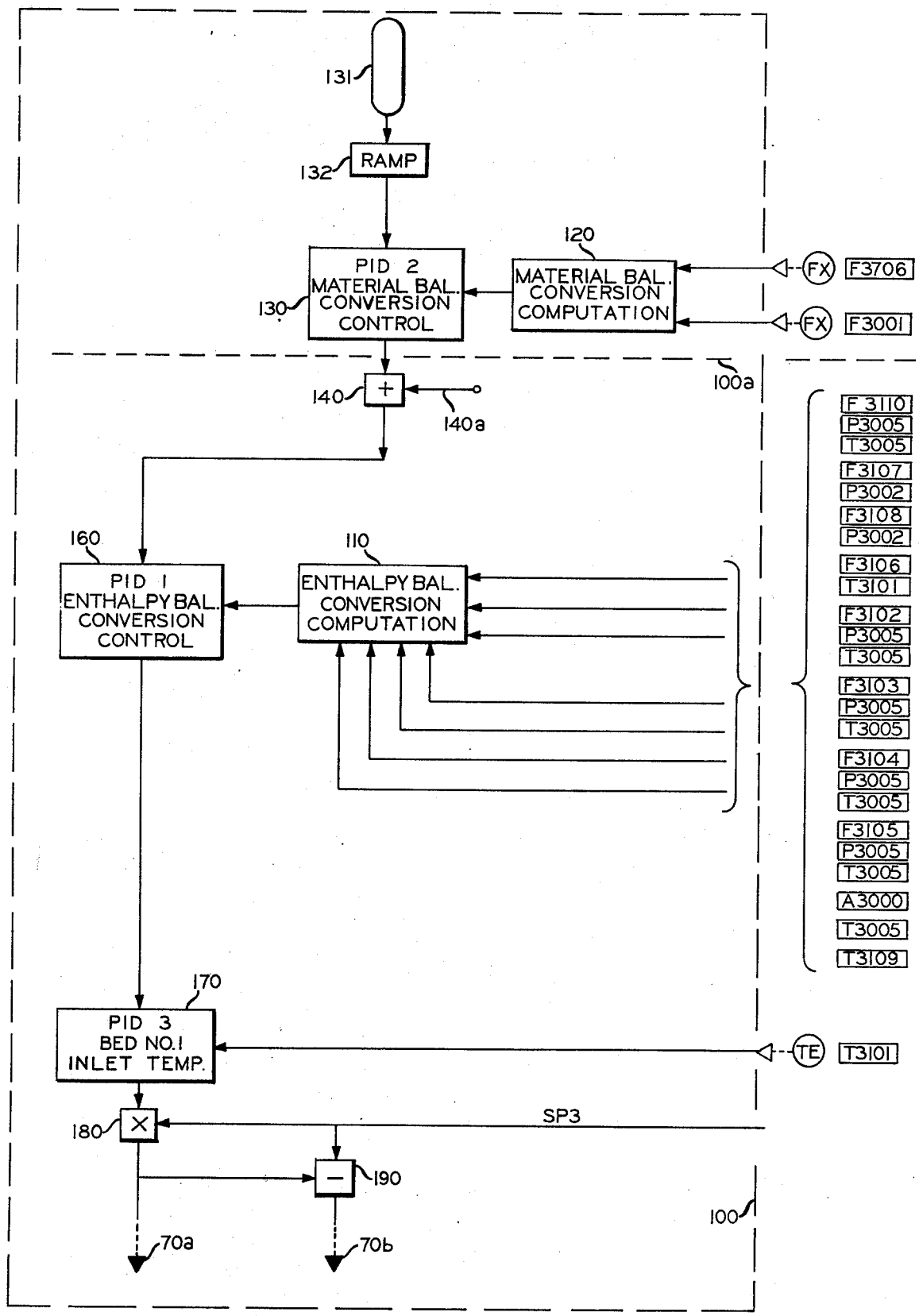
FIG. 3 shows a block diagram for the control of the hydrocracker by a digital computer.

A schematic diagram for control of a hydrocracker is shown in FIG. 3. This FIG. 3 is connected to FIG. 1 via the various computer inputs which are shown in FIG. 1 as white triangles and the corresponding signals are shown in four-digit figures in FIG. 1. The computer output is shown in FIG. 1 as the black triangles 70A and 70B. These computer output signals adjust the set points of the flow controller 30A and 36A respectively. Thus, correspondingly, the flow meters 30B and 36B adjust the control valves 30 and 36, respectively, in the conduits for the hydrogen flow to the furnace and for the flow of hydrogen into the oil directly. The two control signals from the output 70A and 70B are related in the sense that when one of them increases the other decreases by the same amount. Via the control of the distribution of the hydrogen flow, the temperature of the total charge, consisting of fresh feed, recycle feed, hot hydrogen feed (from the furnace), and cold hydrogen feed (from point 38), is controlled. This actual inlet temperature of the total charge to the hydrocracker is increased whenever the calculation indicates that an inlet temperature above the actual inlet temperature is desired to increase the actual conversion rate and this actual inlet temperature is descreased whenever this calculation requests a value below the actual inlet temperature.

FIG. 3 schematically shows a computer 100. The various boxes in this computer are to be understood as software or parts of a computer program when computer 100 is a digital computer. The controllers used in this preferred embodiment of the invention are PID controllers. These controllers are software programs that combine a proportional, a derivative and an integral function.

A material balance conversion computation is carried out in unit 120. The result of this material balance conversion computation, a material balance conversion signal, is transferred to the control input of a PID controller 130. The set point (the desired conversion rate) for the PID controller 130 is transferred from a set point source 131 via a ramp 132 to the set point input of the PID controller 130. The output of the PID controller 130 is biased in a summing unit 140 by a biased signal. This biased signal 140a is proportional to the difference between the enthalpy balance conversion signal FC of the individual reactor and the average enthalpy balance conversion signal of all the individual reactors in case more than one reactor is controlled.

The output of the summing unit 140 is passed to the set point input of a PID controller 160.

The enthalpy balance conversion signal is computed in unit 110 utilizing the signals from the various sources as shown in FIG. 3. The enthalpy balance conversion signal is transferred to the measured input of the PID controller 160. The output of the PID controller 160 is transferred to the set point of a PID controller 170 which is a hydrocracker inlet temperature controller program. The measured input of this PID controller 170 is the inlet temperature to the hydrocracker. The output of the PID controller 170 is the control signal. This control signal is multiplated in a multiplier 180 by a constant SP3. This constant SP3 corresponds to the total hydrogen flow set point in the feed stream. If this total hydrogen flow set point is increased, the constant SP3 will be increased accordingly. The output of this multiplier 180 is converted into an analog signal constituting the set point of the flow controller 30A (FIG. 1). The output of the multiplier 180 is also connected to a subtractor 190. In this subtractor the constant SP3 by which the control signal is multiplied in multiplex 180 is used and from the constant SP3 the control signal is subtracted. The resulting output signal of the subtractor 190 is converted into an analog signal which constitutes the set point of the flow controller 36A.

In case there are more than one hydrocracker to be controlled it is preferred to carry out the computations above the dividing line 100a for all the hydrocrackers together and to carry out the calculations below the dividing line 100a separately for each individual hydrocracker.

The algorithm by which the enthalpy balance conversion signal and the material balance conversion signal are calcuated from the various process parameters is given in the following. From the signals used unit 110 and listed above, another set of signals is calculated which are essentially the hydrogen weights in pounds per hour and the impurity weights in pounds per hour in the four quench streams as well as the mass flow rate of the unreacted oil. These additional signals are calculated in accordance with the following equations:

$$WH2Q2 = 2.016 * AQ * WQ2/MW$$

$$WIQ2 = MWJMP * (1. - AQ) * WQ2/MW$$

$$WH2Q3 = 2.016 * AQ * WQ3/MW$$

$$WIQ3 = MWIMP * (1. - AQ) * WQ3/MW$$

$$WH2Q4 = 2.016 * AQ * WQ4/MW$$

$$WIQ4 = MWIMP * (1. - AQ) * WQ4/MW$$

$$WH2Q5 = 2.016 * AQ * WQ5/MW$$

$$WIQ5 = MWIMP * (1. - AQ) * WQ5/MW$$

$$WOILO = (1. - C) * WOILF$$

$$WISO = (1. + A) * WOIF * C$$

$$WH2QT = WH2Q2 + WH2Q3 + WH2Q4 + WH2Q5$$

$$WHTO = WH2F + WH2QT - A * C * WOILF$$

$$WIQT = WIQ2 + WIQ3 + WIQ4 + WIQ5$$

$WIO = WIQT + WIF$ $WOILF = X * WOILF$

In these equations the abbreviations which are used for the first time have the following meaning:

MWINP = Molecular weight of the impurities (average value).

MW = The average molecular weight in the quench stream.

WH2Q2 = The mass flow rate of the hydrogen in the first quench stream.

WIQ2 = The mass flow rate of the impurities in the first quench stream.

WH2Q3 = The mass flow rate of the hydrogen in the second quench stream.

WIQ3 = The mass flow rate of the impurities in the second quench stream.

WH2Q4 = The mass flow rate of the hydrogen in the third quench stream.

WIQ4 = The mass flow rate of the impurities in the third quench stream.

WH2Q5 = The mass flow rate of the hydrogen in the fourth quench stream.

WIQ5 = The mass flow rate of the impurities in the fourth quench stream.

WOILFL = The mass flow rate of oil in the liquid state at the feed inlet.

WOILO = The mass flow rate of the unreacted oil.

WISO = The mass flow rate of the isocrackate formed.

A = An empirically determined constant which is the product of the average number of parts one oil molecule is cracked into minus one and the ratio of the molecular weight of hydrogen and the average molecular weight of the oil.

WH2QT = The total mass flow rate of hydrogen in the quench streams.

WH2O = The mass flow rate of unreacted hydrogen.

WIQT = The total mass flow rate of the impurities in the quench streams.

WIO = The mass flow rate of impurities leaving the hydrocracker.

C = The conversion set point.

X = The fraction of the total oil feed in liquid state at the hydrocracker feed inlet.

From the signals used in unit 110 listed above and the new set of signals calculated from these signals as defined above, an enthalpy balance calculation is carried out in accordance with the following three equations:

$DH1 = (600 - TI) * (WH2F * CPH2 + WIF * CPI + WOILF * CPOILV) + WOILF * HVAP + (600 - TQ2) * (WIQ2 * CPI + WH2Q2 * CPH2) + (600 - TQ3) * (WIQ3 * CPI + WH2Q3 * CPH2) + (600 - TQ4) * (WIQ4 * CPI + WH2Q4 * CPH2) + (600 - TQ5) * (WIQ5 * CPI + WH2Q5 * CPH2)$ $DH2 = (TO - 600) * (WOILO * CPOILV + WH2O * CPH2 + WIO * CPI + WISO * CPISO)$

In these equations the following constants have been used:

CPH2: Heat capacity of hydrogen.
CPI: Heat capacity of the impurities.
CPOILV: Heat capacity of the oil and vapor phase.
HVAP: Heat of vaporization of oil.
CPISO: Heat capacity of the isocrackate.

From the value DH1 and DH2 the first conversion CQ is calculated in accordance with the following set of equations:

$DH = DH1 + DH2$ $CQ = DH/(HRX * WOILF)$

In these equations the values used have the following meaning:

CQ: Calculated enthalpy balance conversion.
DH: The heat of reaction consumed at 600°F (based on the assumption that no losses occur).
HRX: Specific heat for completely cracking a weight unit of oil feed.

The material balance conversion signal (SC) is calculated in unit 120 based on the signal for the fresh feed rate and the recycle feed rate in accordance with the following equation:

$$SC(120) = \frac{\text{fresh feed rate}}{\text{fresh feed rate + recycle feed rate}} = \frac{F3001}{F3001 + F3706}$$

Instead of this equation also other relations, e.g., the ratio of fresh feed to total feed can be used.

The invention will be still more fully understood from the following calculated example in which actual values for temperatures and feed streams are given and the various results of the various calculations are shown.

EXAMPLE

For a hydrocracking conversion a reactor oil feed was used having the following distillation curve:

$t_{10} = 10\%$ point (°F) = 433°F $t_{50} = 50\%$ point (°F) = 480°F $t_{70} = 70\%$ point (°F) = 513°F $t_{90} = 90\%$ point (°F) = 586°F These temperatures define, as usual, the points where the respective weight percentages of the oil in a distillation have distilled off. The gravity of the reactor oil feed is 38° API.

Thermodynamic Calculation of the Fraction Liquid for the Oil Feed

The following calculation for the fraction X of the oil fed into the reactor which is still liquid is based on the characteristics of the oil, namely the distillation curve and gravity, the conditions of the reactor inlet, namely the temperature and the pressure, and various data taken from the *Data Book on Hydrocarbons*, J. B. Maxwell, January 1955.

1. Calculation of the initial boiling point, the end point of the equilibrium flash curve reference line, the focal point temperature of the oil feed and the focal point pressure of the oil feed.

2. Calculating the average boil point:

The average boiling point is calculated in accordance with the following equation:

$$MABP = (t_{10} + 2\ t_{50} + t_{90})/4.$$

With the values from the distillation curve given above, this results in an average boiling point of 495°F.

3. Determining the average molecular weight of the oil feed:

The average molecular weight of the oil feed is determined by using the relationship between the average boiling point and the average molecular weight given in the book cited above on page 21. The values found by entering the set of curves at 495 and determining the molecular weight between the 30 and the 40° API curve at a location where a 38° API curve would be located. This results in an average molecular weight for the oil XMWOIL of 196.

4. Determining the temperature TFP, TEP and TIBP as well as the pressure PFP:

a. The critical temperature of the oil feed is determined from the average boiling point of 495°F and the gravity of the oil feed of 38° API using the functional relationship shown on page 72 of the *Date Book on Hydrocarbons* cited above. The critical temperature is determined to be 830°F.

b. The slope of the distillation curve reference line is then calculated in accordance with the following formula:

$$S_{DRL} = (t_{70} - t_{10})/60$$

The values of the distillation curve for the reactor oil feed given above result in a slope of the distillation curve reference line of 1.33 °F/%.

c. Calculation of the 50 percent point of the distillation curve reference line. This 50 percent point is calculated in accordance with the following formula:

$$(t_{50})_{DRL} = t_{10} = 40 * S_{DRL}.$$

With the values for $t_{10}$ being 433°F and $S_{DRL}$ being 1.33, the 50 percent point is calculated to be 486°F.

d. Determination of the equilibrium flash curve reference line. This slope is determined by using the functional relationship between the 50 percent point of the distillation curve reference line and the slope of the equilibrium flash reference line shown on page 228 of the data book just mentioned, in the uppermost diagram. The curve that is used is the ASTM-labeled curve. Entering this curve with the value of 1.33 as determined above, the result is:

$$S_{FRL} = f_3(1.33) = 0.7\ °F/\%.$$

e. Determination of the 50 percent point of the equilibrium flash curve reference line. This 50 percent point is determined by entering the curve shown on page 228 of the data book cited above with the value $S_{FRL}$ equal 1.33 and a curve at 486°F which results in a difference of 0 between the distillation curve reference line and the equilibrium flash curve reference line.

Thus the 50 percent point for the equilibrium flash curve reference line is also 486°f; or $$(T_{50})_{FRL} = 486\ °F.$$

f. Determination of the initial boiling point. With these values the initial boiling point of the oil is determined in accordance with the following formula:

$$TIBP = (t_{50})_{FRL}\ 31\ 50 * S_{FRL}.$$

With the values above the initial boiling point is determined to be:

$$TIBP = 486 - 50 * 0.7 = 451\ °F.$$

g. Determination of the end point of the equilibrium flash curve reference line. This end point is determined in accordance with the formula:

$$TEP = (T_{50})_{FRL} + 50 * S_{FRL}.$$

With this formula and the values determined above, the end point is calculated to be 521°F.

h. Determination of the focal point temperature. The focal point temperature is next determined in accordance with the formula:

$$TFP = T_C = 150$$

or, since the critical temperature has been determined above to be 830°F, the focal point temperature is 980°F.

i. Determination of a focal point pressure. The focal point pressure is determined by using the focal point temperature and the vapor pressure chart which is shown on page 42 of the data book mentioned above. This is done by plotting a line for a hydrocarbon with a normal boiling point equal to $(t_{50})_{FRL}$ at normal pressure, i.e., at 1.0 atmosphere. Entering this line with the focal point temperature of 980° results in a focal point pressure of about 50 atmospheres. Thus the focal point pressure is 50 atmospheres.

The results of these determinations thus are:
TFP = 980°F
PFP = 50 atmospheres
TEP = 521°F
TIBP = 451°F.

5. Determination of the fraction of the oil that is liquid at the reactor inlet temperature. The following calculation is based upon the following data:
Total oil feed: 146,000 lbs/hr
Total hydrogen feed: 18,958 lbs/hr
Impurity feed: 11,325 lbs/hr
Average molecular weight of the oil: 196 (as determined above
Molecular weight of hydrogen: 2.016
Average molecular weight of the impurities: 16 a. Molar fraction of oil in the feed stream. The molar fraction of oil in the feedstream is determined in accordance with the formula:

$$Y = (WO/XMWO)/(WO/XMWO + WH/2.016 + WI/XMWI).$$

With the values given above the fraction is calculated to be:

$$Y = (146000/196)/(14600/196 = 18958/2.016 + 11325/16) = .06861.$$

b. Calculating the partial pressure of the oil feed.

The partial pressure of the oil feed in atmospheres is calculated in accordance with the formula:

$$PP = (PY = 14.7)/14.7.$$

With the value of Y calculated above and an inlet pressure of P = 1590 psig, the partial pressure PP is found to be 8.42 atmospheres.

c. Calculation of the temperatures of the saturated oil liquid phase and the temperature of the saturated oil vapor phase. In the equilibrium state Antoin's Law relates the vapor pressure to the temperature of the oil in accordance with the following equation:

$$\text{Log } P_r = A - \frac{B}{T+C}$$

wherein A and B are constants and C is a constant for transforming the temperature to absolute temperatures; thus C in the case of T being measured in degrees Fahrenheit is 460.

From this linear relationship and two points in this linear relationship being known, namely the initial boiling point of 451°F and the pressure of 1 atmosphere, as well as the focal point temperature of 980 and the pressure of 50 atmospheres, the temperature of the saturated liquid oil can be readily determined from the partial pressure being 8.42 atmospheres to be 686°F. Thus:

$$TSL = 686°F.$$

Similarly, the temperature of the saturated oil vapor can be determined. This time the two known points in the Antoine's Law relationship are:

The focal point, 980°F and 50 atmospheres; and
The equilibrium flash curve reference line end point, 521°F and one atmosphere.

With this linear relationship and the partial pressure of 8.42 atmospheres, the saturated vapor temperature is determined to be 730°F, or:

$$TSV = 730°F.$$

d. Calculation of the fraction liquid.
This fraction is calculated by the formula:

$$XLIQ = \frac{TSV - T_{in}}{TSV - TSL}$$

with the further provision:
If $XLIQ > 1$, $XLIQ = 1$

If $XLIQ > 0$, $XLIQ = 0$.

With this system the fraction shown above for an inlet temperature $T_{in}$ of 590°F, this fraction is calculated to be 3.18. This means that the entire quantity of oil is liquid at the reactor inlet. Thus the value for X is 1 in this example. This value is used in the enthalpy balance calculations.

Furthermore, the following operating conditions, parameters and feedstocks are given for the hydrocracker:

C = .6

WH2F = 18958. lbs/hr

WIF = 11325. lbs/hr

WOILF = 146000. lbs/hr

TI = 590. °F

WQ2 = 885.9 lbs/hr

WQ3 = 1646.2 lbs/hr

WQ4 = 0.0

WQ5 = 596.9 lbs/hr

AQ = 0.9

TQ2 = 130. °F

TQ3 = 130. °F

TQ4 = 130. °F

TQ5 = 130. °F

From the figures given above it follows that the oil feed in the liquid state is also 146,000 pounds per hour.

The various heat capacities and constants are:

CPH2 = 3.53

CPI = 0.788

CPOILV = 0.78

CPISO = 0.8

HVAP = 90

HRX = 290

TO = 635 °F

With these values and the equations given above, DH1 is calculated to be 18,338,903 Btu/hr and DH2 equals 6,780,188 Btu/hr. Thus the result for the enthalpy balance conversation calculation is CQ equals to 0.593.

The material balance onversion computation is based upon the following feed rates:
Fresh feed rate = 84,680 lbs/hr
Recycle feed rate = 61,320 lbs/hr.

These figures result in a slow conversion rate of 0.58.

Since the conversion C which is desired is set to 0.6 in the present case, both the material balance conversion signal and the enthalpy balance conversion signal are below the set point. Therefore a control signal is computed by the computer which essentially is proportional both to the difference between the enthalpy balance conversion signal and the set point and to the difference between the material balance conversion signal and the set point. The control signal computer will increase the flow of hydrogen through the furnace in order to increase the temperature of the total charge ahd thereby the temperature of the hydrocracker. This, in turn, will increase the conversion rate.

Reasonable variations and modifications which will be apparent to those skilled in the art can be made in this invention without departing from the spirit and scope thereof.

We claim:

1. A method for controlling the conversion of a hydrocracker comprising
   a. passing a stream of fresh oil feed into the feed inlet portion of said hydrocracker as part of the charge thereto,
   b. passing at least one hydrogen stream into the feed inlet portion of said hydrocracker as part of the charge thereto,
   c. withdrawing reactor effluent from said hydrocracker,
   d. separating from said reactor effluent a recycle oil stream,
   e. passing said recycle oil stream into the feed inlet portion of said hydrocracker as part of the charge thereto,
   f. determining the rate of total oil flow into the hydrocracker and generating a total oil flow rate signal responsive thereto,
   g. generating hydrogen mass flow rate signals for each hydrogen stream introduced into the reactor,
   h. determining the inlet temperature of the charge to the hydrocracker at the feed inlet portion thereof and generating an inlet temperature signal responsive thereto,
   i. determining the temperature of the effluent withdrawn from the hydrocracker proximate to the outlet portion thereof and generating an outlet temperature signal responsive thereto,
   j. automatically computing from the signals generated in step (f) through (i) an enthalpy balance conversion and generating an enthalpy balance conversion signal responsive thereto,
   k. determining the flow rate of said recycle oil stream and generating a recycle oil flow rate signal,
   l. automatically computing from said total oil flow rate signal and from said recycle oil flow rate signal a material balance conversion and generating a material balance conversion signal responsive thereto,
   m. generating an inlet temperature control signal responsive to both the material balance conversion signal and the enthalpy balance conversion signal, with the further provision that the material balance conversion is calculated for a first set of parameters and the enthalpy balance conversion is calculated for a second set of parameters determined at a time subsequent to the determination of the first set of parameters,
   n. generating a control signal responsive to the inlet temperature control signal and the inlet temperature signal.
   o. regulating the temperature of the charge to the hydrocracker at the feed inlet port thereof responsive to said control signal such as to control the actual conversion rate of the hydrocracker to keep it at a desired value.

2. A process in accordance with claim 1 wherein said inlet temperature control signal is generated with the further provision that in case an increase (decrease) of the material balance conversion signal in the absence of a simultaneous change of the enthalpy balance conversion signal causes a change in the inlet temperature control signal that tends to decrease (increase0 the inlet temperature also an increase (decrease) of the enthalpy balance conversion signal in the absence of a change of the material balance conversion signal causes a change in the inlet temperature control signal that tends to decrease (increase) the inlet temperature.

3. A process in accordance with claim 1 wherein the flow rate of the fresh oil feed is determined and a corresponding fresh oil feed rate signal is generated and wherein the material balance conversion signal is automatically calculated as the ratio of the fresh oil feed rate signal to the sum of the fresh oil feed rate signal and the recycle oil flow rate signal.

4. A process in accordance with claim 1 wherein
   a. a first hydrogen stream is passed through a heating unit;
   b. a second hydrogen stream is generated;
   c. said first hydrogen stream leaving the heating unit and said second hydrogen stream are mixed with the oil feedstream;
   d. the oil feedstream with the admixed hydrogen is introduced into the hydrocracker;
   e. the flow of the first hydrogen stream through the heating unit and the flow rate of the second hydrogen stream are both controlled by said control signal so that the ratio of the first to the second hydrogen stream is controlled while the sum of the flow rates of the first and the second hydrogen streams remains at a desired value.

5. A method in accordance with claim 4 wherein the temperature of the first hydrogen stream leaving the heating unit is kept at a predetermined value by a temperature controller which temperature controller determines the temperature of the first hydrogen stream leaving the heating unit and responsive thereto controls the heat input into the heating unit such as to keep the temperature of the first hydrogen stream leaving the heating unit at said value.

6. A process in accordance with claim 1 wherein hydrogen with a known degree of impurities is used in the hydrocracker, wherein from the hydrogen flow of each hydrogen stream and the known degree of impurities an impurity flow signal is generated for the respective stream and wherein the first conversion rate is calculated utilizing these impurity flow signals for the hydrogen streams.

7. A process in accordance with claim 1 wherein
   a. the total enthalpy difference is automatically calculated for the hydrocracker which enthalpy difference is necessary to bring the reactants introduced into the hydrocracker from their temperature to a fixed reaction temperature between their temperature and the outlet temperature and to further bring these reactants in the hydrocracker from said fixed reaction temperature to the outlet temperature and to the outlet composition and wherein correspondingly an enthalpy difference signal is generated;
   b. the enthalpy difference signal representing the total enthalpy change at the fixed reaction temperature is automatically divided by the product of the total oil flow and the specific cracking enthalpy for the oil at this fixed reactor temperature to obtain said enthalpy balance conversion 8. A process in accordance with claim 1 wherein
   a. a hydrocracker is controlled having a plurality of fixed catalyst beds;
   b. a quench stream of hydrogen is injected into at least one of the catalyst beds;
   c. the mass flow of hydrogen in each quench stream is determined and a corresponding quench hydrogen signal is generated;
   d. the temperature of said catalyst bed into which the hydrogen streams are injected is determined and correspondingly catalyst bed temperature signals are generated;

e. the flow of each of said quench streams is controlled by the corresponding catalyst bed temperature signal such as to keep the temperature of the respective catalyst bed at a constant value by controlling the corresponding hydrogen flow into the corresponding catalyst bed.

9. A process in accordance with claim 1 wherein
a. a plurality of hydrocrackers is controlled by the same control process;
b. said material balance conversion signal is computed for all the reactors together; and
c. said entalpy balance conversion signal is generated for each reactor individually.

10. A process in accordance with claim 9 wherein
a. the enthalpy balance conversion signals generated for each individual reactor are added to form an average enthalpy balance conversion signal;
b. wherein a deviation signal for each individual reactor is generated which corresponds to the difference between the enthalpy balance conversion signal for this individual reactor and the average enthalpy balance conversion signal; and
c. wherein said material balance conversion signal computer for all the reactors together is biased by the deviation signal for the individual reactor and this biased signal and the individual enthalpy balance conversion signal are converted into the control signal.

11. A process in accordance with claim 10 wherein
a. the material balance conversion signal for all reactors together is compared to the conversion set point in a conversion controller generating a first intermediate signal corresponding to the deviation of the material balance conversion signal from the set point;
b. said first intermediate signal is added to said deviation signal of each of the individual reactors resulting in a series of second intermediate signals, one for each individual reactor;
c. each second intermediate signal is compared to the corresponding signal of the enthalpy balance conversion computation, said second intermediate signal constituting the set point of an enthalpy balance conversion controller whereas the enthalpy balance conversion signal constitutes the measured input of said enthalpy balance conversion controller, resulting in said inlet temperature control signal constituting the set point of said inlet temperature controller.

* * * * *